United States Patent [19]

Hartkopf et al.

[11] 4,259,884
[45] Apr. 7, 1981

[54] APPARATUS FOR INTERNALLY PEELING METAL TUBES

[75] Inventors: Heinz Hartkopf, Solingen; Ulrich Lomberg, Velbert, both of Fed. Rep. of Germany

[73] Assignee: Th. Kieserling & Albrecht, Solingen, Fed. Rep. of Germany

[21] Appl. No.: 73,954

[22] Filed: Sep. 10, 1979

[30] Foreign Application Priority Data

Sep. 8, 1978 [DE] Fed. Rep. of Germany ....... 2839155

[51] Int. Cl.³ ...................... B23B 41/06; B23B 51/00
[52] U.S. Cl. ...................................... 82/1.5; 408/159
[58] Field of Search ................. 82/1.5; 408/154, 156, 408/158, 159, 160

[56] References Cited

U.S. PATENT DOCUMENTS

| | | | |
|---|---|---|---|
| 1,345,929 | 7/1920 | Johnson | 408/160 |
| 3,664,755 | 5/1972 | Carns | 408/159 |
| 3,827,823 | 8/1974 | Lhomme | 408/158 |
| 3,854,839 | 12/1974 | Gottelt | 82/1.5 |
| 3,918,826 | 11/1975 | Friedline | 408/154 |

FOREIGN PATENT DOCUMENTS 574699 4/1933 Fed. Rep. of Germany .
2120519 11/1972 Fed. Rep. of Germany .
2802390 7/1979 Fed. Rep. of Germany .

*Primary Examiner*—Harrison L. Hinson
*Attorney, Agent, or Firm*—Edward E. Sachs

[57] ABSTRACT

Apparatus for internally peeling metal tubes includes a peeling head rotatable about a longitudinal axis. An elongated cutter holder having opposite end portions is mounted on the head and extends generally parallel to the longitudinal axis of the head. One end portion of the cutter holder is mounted to the head by a pivot connection for providing swinging movement of the holder toward and away from the longitudinal axis of the head. Both of the end portions of the cutter holder are also adjustable outwardly and inwardly relative to the longitudinal axis of the head.

10 Claims, 2 Drawing Figures

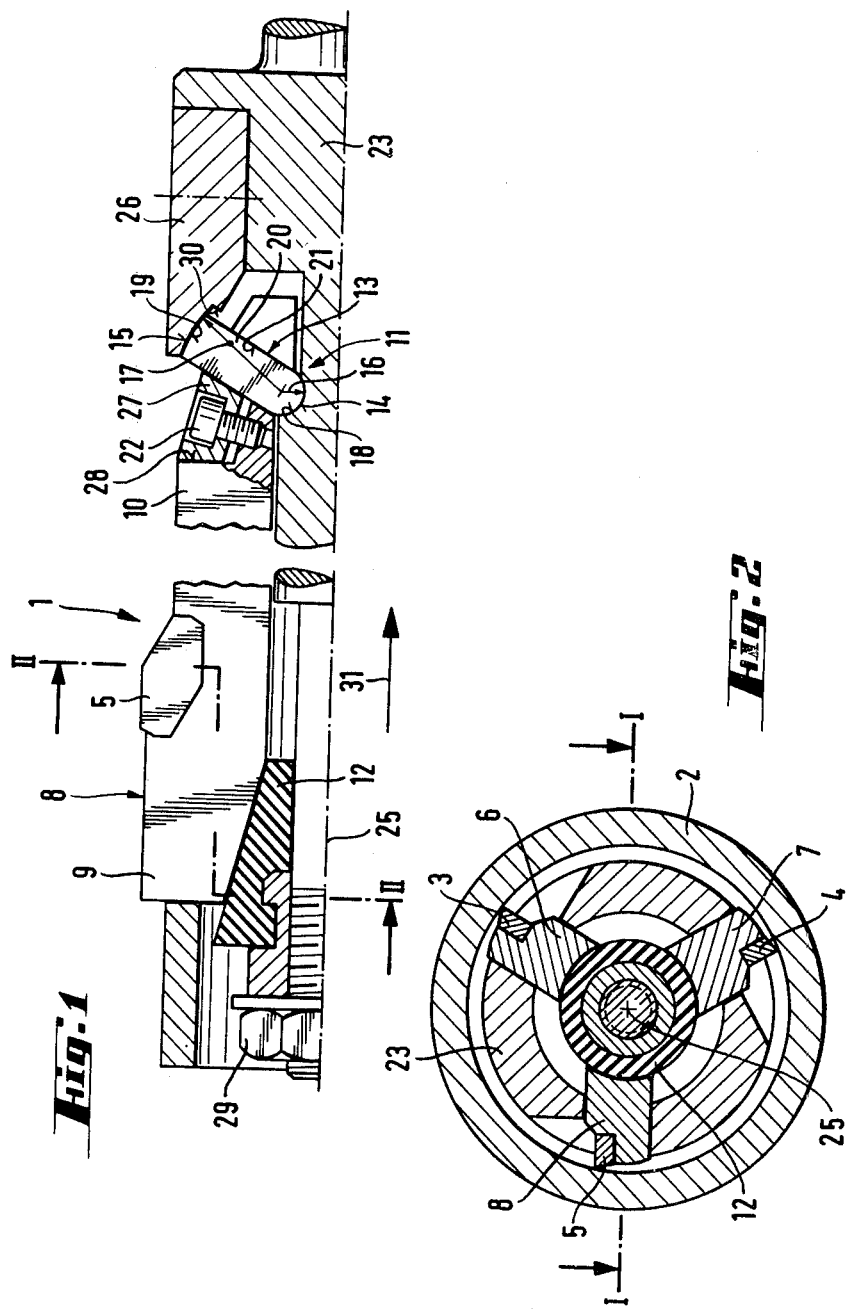

APPARATUS FOR INTERNALLY PEELING METAL TUBES

BACKGROUND OF THE INVENTION

This application relates to the art of peeling apparatus for internally peeling metal tubes. The invention is particularly applicable to such apparatus for cleaning or lightly peeling tubes having out-of-round internal cross-sectional configurations, such as oval-shaped.

It is desirable to provide at least limited inward and outward adjustment of cutter holders on peeling heads for internally peeling tubes of different diameters. It is very desirable to have such an adjustment which can be made without changing the attack angle or cutting geometry of the cutters. In peeling heads of this type having rigidly mounted cutter holders, the cutters are capable of acting only on essentially true cylindrical surfaces.

It is frequently desirable to clean or lightly peel internal surfaces of tubes having non-circular cross-sectional configurations. That is, the tubes are only slightly out of round, such as slightly oval. In order to clean or lightly peel such surfaces, the cutter holders are pivotally mounted to the head adjacent one end portion of the cutter holders. This allows the cutter holders to swing outwardly under the influence of centrifugal force as the cutter head rotates. The cutters are then capable of acting on out-of-round internal surfaces. In previous arrangements, inward and outward adjustment of the swingable cutter holders was possible only at the swingable end portions thereof. Such an adjustment arrangement changes the attack angle or cutting geometry of the cutters in an undesirable manner.

It would be desirable to have a cutter head with cutter holders which would be swingable outwardly and inwardly, and would also be adjustable for acting on different diameters without changing the cutting geometry of the cutters.

SUMMARY OF THE INVENTION

A peeling head rotatable about a longitudinal axis includes an elongated cutter holder extending generally parallel to such axis and having opposite holder end portions. One of the holder end portions is pivotally connected to the head by a pivot connection for swinging motion of the holder to move a cutter carried by the holder toward or away from the head longitudinal axis. Adjustment means is provided for adjusting both of the holder end portions inwardly and outwardly relative to the head longitudinal axis for changing the diameter on which the cutter acts without changing the cutting geometry thereof, while also allowing swinging movement of the cutter holder.

In one arrangement, the pivot connection includes a pin extending outwardly or transversely of the head longitudinal axis. The pin is attached to the head for swinging movement thereof toward and away from the head longitudinal axis. The holder is adjustably attached to the pin for movement therealong to define part of the adjustment means.

The pin on which the holder is adjustably mounted is outwardly curved at one pin end and the head has a socket receiving such one pin end for swinging movement of the pin in the socket. The pin has an opposite pin end which is outwardly curved at a much greater radius of curvature than the one pin end, and the head has a curved guide surface cooperating with the opposite pin end. The intermediate pin portion, located between the pin ends, is of non-circular cross-sectional shape. The holder has a guideway corresponding in size and shape to the size and shape of the intermediate pin portion, and slidably receives the intermediate pin portion. Releasable clamping means is provided for releasably clamping the holder to the intermediate pin portion.

Stop means is provided on the head for limiting outward swinging movement of the holder.

It is a primary object of the present invention to provide a peeling head with cutter holders which are swingable while also being adjustable to different diameters without changing the cutting geometry of the cutters.

It is another object of the invention to make the cutter holders on a peeling head both swingable and adjustable in a simplified and reliable manner.

It is an additional object of the invention to provide a peeling head with swingable cutter holders which are adjustable, not only at their free end portion, but also at their pivotally connected end portions.

BRIEF DESCRIPTION OF THE DRAWING

FIG. 1 is a partial cross-sectional side elevational view taken generally on line I—I of FIG. 2, and with portions cut-away for clarity of illustration; and FIG. 2 is a cross-sectional end elevational view showing the cutter head of the present invention positioned within a metal tube.

DESCRIPTION OF A PREFERRED EMBODIMENT

Referring now to the drawing, there is shown a peeling head 1 in FIG. 1 which is positioned internally of a generally cylindrical metal tube 2 in FIG. 2 for peeling the internal surface of the tube. The peeling head 1 is rotatable about a longitudinal axis 25, and is normally pulled through the tube 2 in the direction of arrow 31 in FIG. 1. It will be recognized that it is possible to pull the tube 2 past the peeling head 1 in a direction opposite to the direction 31 instead of longitudinally moving the peeling head 1.

As best shown in FIG. 2, the peeling head has three cutters 3, 4 and 5, each of which is respectively mounted to a cutter holder 6, 7 and 8. The cutters, cutter holders and their mounting arrangements are all identical, and only one mounting arrangement will be described in detail in FIG. 1.

With reference to FIG. 1, the elongated cutter holder 8 has opposite holder end portions 9, 10 and is mounted to the peeling head 1 in a position extending substantially parallel to the peeling head longitudinal axis 25. Engagement between the cutter 5 carried by the holder 8 and the internal surface of a tube urges the holder end portion 9 inwardly against an adjustment means 12 in the form of a generally conical ring of elastomeric material, such as rubber or the like. The outer conical surface of the adjustment ring 12 cooperates with a corresponding surface on the cutter holder 8. The cutter holder 8, and therefore the cutter 5, are yieldably or elastically supported by the elastomeric adjustment ring 12 at the holder end portion 9. The cutter 5 is mounted closer to the trailing end portion 9 of the holder 8 than to the leading holder end portion 10.

A pivot connection 11 pivotally supports the cutter holder leading end portion 10 on the cutter head 1. The pivot connection 11 includes a pin or pin-like connecting element 13 having one outwardly curved pin end 14 with a relatively small radius 16, and an opposite pin end 15 outwardly curved at a much greater radius of curvature 17. The outwardly curved convex surfaces 14, 15 are curved about a common center and the radius 17 is approximately three times as great as the radius 16. A socket 18 in a body portion 23 of the peeling head 1 is curved at the same curvature as the pin end 14 and cooperatively receives same much in the manner of a ball and socket joint. A securing element 26, suitably detachably secured to the body portion 23 of the peeling head 1, has a curved guide surface 19 which is curved at approximately the same radius as the pin end 15 and cooperates with same for holding the pin 13 in position on the head 1 and guiding pivotal movement of the pin relative to the head.

The pin or pin-like element 13 is curved in only one plane at its opposite ends so that the pin can pivot only toward and away from the peeling head longitudinal axis 25, and cannot rotate about its longitudinal axis or pivot in other directions, such as in and out of the plane of the paper in FIG. 1. The pin 13 is positioned extending transversely or outwardly relative to the peeling head longitudinal axis 25, and is inclined at an included angle of approximately 60° to the longitudinal axis 25. The pin 13 can pivot clockwise in FIG. 1 about the surfaces 14, 18 to decrease the included angle of the pin longitudinal axis with the peeling head longitudinal axis 25. Stop means in the form of a stop surface 30 is provided on the securing element 26 to limit the angle through which the pin 13 can pivot.

The pin 13 has an intermediate pin portion 20 between the opposite pin ends 14, 15 which is of non-circular cross-sectional configuration. The intermediate pin portion 20 is preferably polygonal so it has a plurality of straight sides which intersect one another. A guideway 21 formed through the cutter holder leading end portion 10 is of substantially the same size and shape as the intermediate pin portion 20. The guideway 21 in the cutter holder 8 slidably receives the intermediate pin portion 20 of the pin 13.

Releasable clamping means includes a clamp member 27 secured to the leading end portion 10 of the cutter holder 8 by a clamping bolt 22. Cooperation between cam surfaces generally indicated at 28 between the clamping member 27 and the cutter holder 8 urges the clamping member 27 tightly against the intermediate pin portion 20 when the bolt 22 is tightened for securely clamping the leading end portion 10 to the pin 13 against movement relative thereto. Loosening of the clamping bolt 22 allows the leading holder end portion 10 to move longitudinally along the pin 13 inward and outwardly relative to the peeling head longitudinal axis 25.

The diameter on which the cutters act is adjusted by operating an adjustment bolt assembly 29 to move the adjustment collar 12 parallel to the longitudinal axis 25 for moving the cutter holder trailing end portions 9 inwardly or outwardly relative to the longitudinal axis 25. Loosening of the clamping bolt 22 allows the cutter holder leading end portion 10 to be adjusted inwardly or outwardly the same distance relative to the longitudinal axis 25 so that the cutter holder will remain, if so desired, in the same position extending generally parallel to the longitudinal axis 25. Once an adjustment of the leading end portion 10 is made, the adjustment bolt 22 is again tightened. The described adjustment at both of the opposite end portions of the cutter holder makes it possible to adjust the cutting diameter without changing the cutter geometry or the angle of attack of the cutting edges. At the same time, outward swinging movement of the cutter holders under the action of centrifugal force is possible at any inwardly or outwardly adjusted position of the cutter holders.

Outward pivotal movement of the cutter holders makes it possible to lightly peel or clean tubes which are slightly out-of-round or oval in cross-sectional shape. At the same time, inward and outward adjustment of the cutter holders for peeling tubes of slightly different diameters is possible by operating the adjustment collar 12, and loosening the clamping bolt 22.

Mounting means for mounting the cutter holders for swinging movement, and for inward and outward adjustment, is defined by the pivot connection and the adjustment means. The pivot connection being defined by the pin 13, while the adjustment means is defined generally by the adjustment collar 12 and the clamping member 27.

The pin or pin-like member 13 is inclined in a direction toward the leading end of the peeling head 1. This insures that the outwardly curved convex pin end 14 will be sufficiently guided in the correspondingly curved socket 18. With this inclined arrangement of the pin, the axial components of cutting force are transmitted through the pin 13, the pin end 14 and the socket 18 in the body portion 23 of the peeling head 1.

While there has been described what is at present considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for internally peeling tubes comprising: a peeling head having a longitudinal axis about which said head is rotatable, an elongated cutter holder extending generally parallel to said axis and having opposite end portions, a cutter mounted on said holder, one of said end portions being pivotally connected to said head at a pivot connection for swinging motion of said holder to move said cutter toward or away from said axis, and adjustment means for adjusting both of said end portions inwardly and outwardly relative to said axis.

2. The apparatus of claim 1 wherein said pivot connection includes a pin extending outwardly of said axis and being attached to said head for swinging movement thereof toward and away from said axis, and said holder being attached to said pin.

3. The apparatus of claim 2 wherein said holder is adjustably attached to said pin for adjustable movement therealong to define part of said adjustment means.

4. The apparatus of claim 2 wherein said pin is outwardly curved at one pin end and said head has a socket receiving said one pin end for swinging movement of said pin in said socket, said pin having an opposite pin end which is outwardly curved at a greater radius of curvature than said one pin end, and said head having a curved guide surface adjacent said opposite pin end.

5. The apparatus of claim 4 wherein said pin has an intermediate pin portion between said ends of non-circular cross-sectional shape, said holder having a guideway receiving said intermediate pin portion, and releasable clamping means for releasably clamping said holder to said intermediate pin portion.

6. The apparatus of claim 1 including stop means for limiting outward swinging movement of said holder.

7. Apparatus for internally peeling tubes comprising: a cutter head having a longitudinal axis, a cutter holder having opposite end portions, and mounting means for mounting said holder to said head for swinging movement of said holder outwardly and inwardly relative to said axis about one of said end portions and for adjusting movement of both said end portions toward and away from said axis.

8. The apparatus of claim 7 wherein said mounting means includes a pivot connection pivotally connecting said one end portion of said holder to said head.

9. The apparatus of claim 8 wherein said pivot connection includes a pin extending transversely of said axis and said one end portion of said holder is releasably clamped to said pin for adjustable movement of said one end portion along said pin.

10. The apparatus of claim 7 wherein said mounting means includes a pin extending transversely of said axis and having opposite pin ends, one said pin end being outwardly curved and said head having a socket receiving said one pin end for swinging movement of said pin toward and away from said axis, said pin having an opposite pin end which is outwardly curved at a greater radius of curvature than said one pin end, said head having a curved guide surface cooperating with said opposite pin end, and said one end portion of said holder being mounted on said pin.

* * * * *